United States Patent [19]

Oda et al.

[11] Patent Number: 5,382,206
[45] Date of Patent: Jan. 17, 1995

[54] METHOD OF AND SYSTEM FOR CONTROLLING THE SPEED OF A MOTOR VEHICLE BASED ON AN ADJUSTABLE CONTROL CHARACTERISTIC SO THAT THE SPEED OF THE VEHICLE FOLLOWS A TARGET SPEED

[75] Inventors: Kyoji Oda, Tokai; Hitoshi Takeuchi, Toyohashi; Masao Tsujii, Nagoya; Masahiro Ohba, Okazaki, all of Japan

[73] Assignee: Nippondenso Co., Ltd., Kariya, Japan

[21] Appl. No.: 904,051

[22] Filed: Jun. 26, 1992

[30] Foreign Application Priority Data

Jun. 26, 1991 [JP] Japan .................. 3-154694

[51] Int. Cl.$^6$ .................... B60K 31/00
[52] U.S. Cl. ................ 477/108; 477/97; 180/197
[58] Field of Search ........ 74/866; 364/424.1, 426.04; 180/179; 477/108, 97

[56] References Cited

U.S. PATENT DOCUMENTS

| | | | |
|---|---|---|---|
| 4,771,389 | 9/1988 | Takahashi et al. | 364/513 |
| 4,829,438 | 5/1989 | Etoh | 364/426.04 |
| 4,908,764 | 3/1990 | Etoh | 364/426.04 |
| 5,129,475 | 7/1992 | Kawano et al. | 364/426.04 |
| 5,137,104 | 8/1992 | Etoh | 364/426.04 X |
| 5,154,250 | 10/1992 | Murai | 74/866 X |
| 5,184,527 | 2/1993 | Nakamura | 477/97 X |
| 5,189,618 | 2/1993 | Tsujii et al. | 364/426.04 |

FOREIGN PATENT DOCUMENTS

| | | |
|---|---|---|
| 61-191435 | 8/1986 | Japan . |
| 62-85733 | 4/1987 | Japan . |
| 62-241737 | 10/1987 | Japan . |
| 63-64833 | 3/1988 | Japan . |
| 64-9039 | 1/1989 | Japan . |
| 64-44230 | 3/1989 | Japan . |
| 331902 | 2/1991 | Japan . |

OTHER PUBLICATIONS

"System Identification: Theory for the User", L. Ljung, pp. 307–311.

Primary Examiner—Dirk Wright
Assistant Examiner—Khoi Q. Ta
Attorney, Agent, or Firm—Cushman, Darby & Cushman

[57] ABSTRACT

A method of and system for controlling the speed of a motor vehicle based on a control characteristic so that the speed of the vehicle follows a target speed. The system estimates a dynamic characteristic of the motor vehicle to adjust the control characteristic when the motor vehicle is under a cruising control. The system includes a sensor for detecting a speed of the motor vehicle and a sensor for detecting an operating position of an actuator which adjusts a travelling speed of the motor vehicle. In the system, the detected vehicle speed and actuator operating position are converted into data in terms of an imaginary operating point. The imaginary operating point remains constant because it is not affected by variations of a static characteristic of the motor vehicle. The dynamic characteristic of the motor vehicle is estimated on the basis of the conversion data. This arrangement can accurately estimate the dynamic characteristic of the motor vehicle.

20 Claims, 16 Drawing Sheets

COMPENSATOR (DISCRETE-VALUE SYSTEM)

MINOR SERVO SYSTEM COMPENSATOR

METHOD OF AND SYSTEM FOR CONTROLLING THE SPEED OF A MOTOR VEHICLE BASED ON AN ADJUSTABLE CONTROL CHARACTERISTIC SO THAT THE SPEED OF THE VEHICLE FOLLOWS A TARGET SPEED

BACKGROUND OF THE INVENTION

The present invention relates generally to a speed control system for motor vehicles, and more particularly to a control system having a function to adjust a control characteristic of a control unit of an actuator to regulate a speed of a motor vehicle to a target value when the motor vehicle is under cruising control.

The Japanese Utility Model Provisional Publication No. 64-44230 discloses such a conventional speed control system which estimates the dynamic characteristic of a motor vehicle, varying in accordance with the travelling condition of the motor vehicle, in real time so as to obtain the control coefficient for the PID control calculation on the basis of the estimation result. This conventional speed control apparatus can obtain the control characteristic coping with the variation of the operating condition which is a disturbance for the constant-speed (cruising) control operation.

Here, a model of a motor vehicle depends upon the static characteristic and dynamic characteristic of the motor vehicle as shown in FIG. 23. The static characteristic of the motor vehicle represents the relation between an opening degree of a throttle valve and the speed of the motor vehicle steadily obtained in response to the throttle opening degree. The throttle opening degree and a vehicle speed are substantially in the proportional relation to each other, and hence the static characteristic can be approximated with a linear function. On the other hand, the dynamic characteristic of the motor vehicle represents the relation between the variation of the throttle opening degree (input) and the variation of the vehicle speed (output) occurring in response to the variation of the throttle opening degree. This dynamic model of the motor vehicle is the vehicle model to be estimated, and can be expressed with a first-order transfer function if taking into account the weight of the motor vehicle and others. The gain K in the transfer function is indicative of the variation (k/h) of the vehicle speed taken when the throttle opening degree varies by one, and the time constant $\tau$ is representative of the time taken until the vehicle speed variation reaches 63% of the gain K.

Thus, if assuming that the vehicle static characteristic is fixed, the dynamic characteristic in the vehicle model can be estimated on the basis of the variation of the vehicle speed to the variation of the throttle opening degree detected. Further, the actual vehicle speed estimation value becomes a value obtained by adding the vehicle speed due to the dynamic characteristic component caused by the estimated dynamic characteristic to the vehicle speed due to the static characteristic.

However, for example, when the slope of the road surface, the load of the vehicle or others varies the static characteristic of the motor vehicle varies. In the case of the variation of the vehicle static characteristic, if the dynamic characteristic is estimated merely on the basis of the detected vehicle speed and throttle opening degree, the vehicle speed and the throttle opening degree vary in accordance with the variation of the vehicle static characteristic whereby there is the possibility that the vehicle dynamic characteristic is estimated in error.

SUMMARY OF THE INVENTION

It is therefore an object of the present invention to provide a speed control system for a motor vehicle which is capable of accurately estimating the vehicle dynamic characteristic irrespective of the variation of the vehicle static characteristic to improve the controllability in the cruising speed control of the motor vehicle.

According to this invention, for controlling the speed of a motor vehicle, the speed of the motor vehicle and the operating position of a Vehicle-speed adjusting actuator are detected and converted into data in terms of an imaginary operating point which is always constant and not affected by variation of a static characteristic of the motor vehicle, and the dynamic characteristic of the motor vehicle is estimated on the basis of the conversion data. The control characteristic in the cruising control is adjusted in accordance with the estimated vehicle dynamic characteristic.

More specifically, according to this invention, there is provided a speed control system for a motor vehicle, comprising: means for detecting a travelling speed of the vehicle; means for setting a target speed for a constant-speed travelling of the vehicle on a road surface; actuator means for adjusting the travelling speed of the vehicle; means for controlling the actuator means so that the travelling speed of the vehicle follows the target speed; means for detecting an operating position of the actuator means; means for detecting a gear-shifted state in a transmission of the vehicle; means for, setting an imaginary operating point on the basis of the gear-shifted state in the transmission, the imaginary operating point being indicative of an original point of a pre-stored static characteristic of the travelling speed of the vehicle for the operating position of the actuator means; means for converting data comprising the detected vehicle travelling speed and the detected actuator means operating position into data defined in terms of the set imaginary operating point; means for estimating a dynamic characteristic of the vehicle from a variation of the traveling speed of the vehicle to a variation of the operating position of the actuator means on the basis of the converted travelling speed and actuator operating position; and means for adjusting a control characteristic of the control means in accordance with the estimated vehicle dynamic characteristic.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
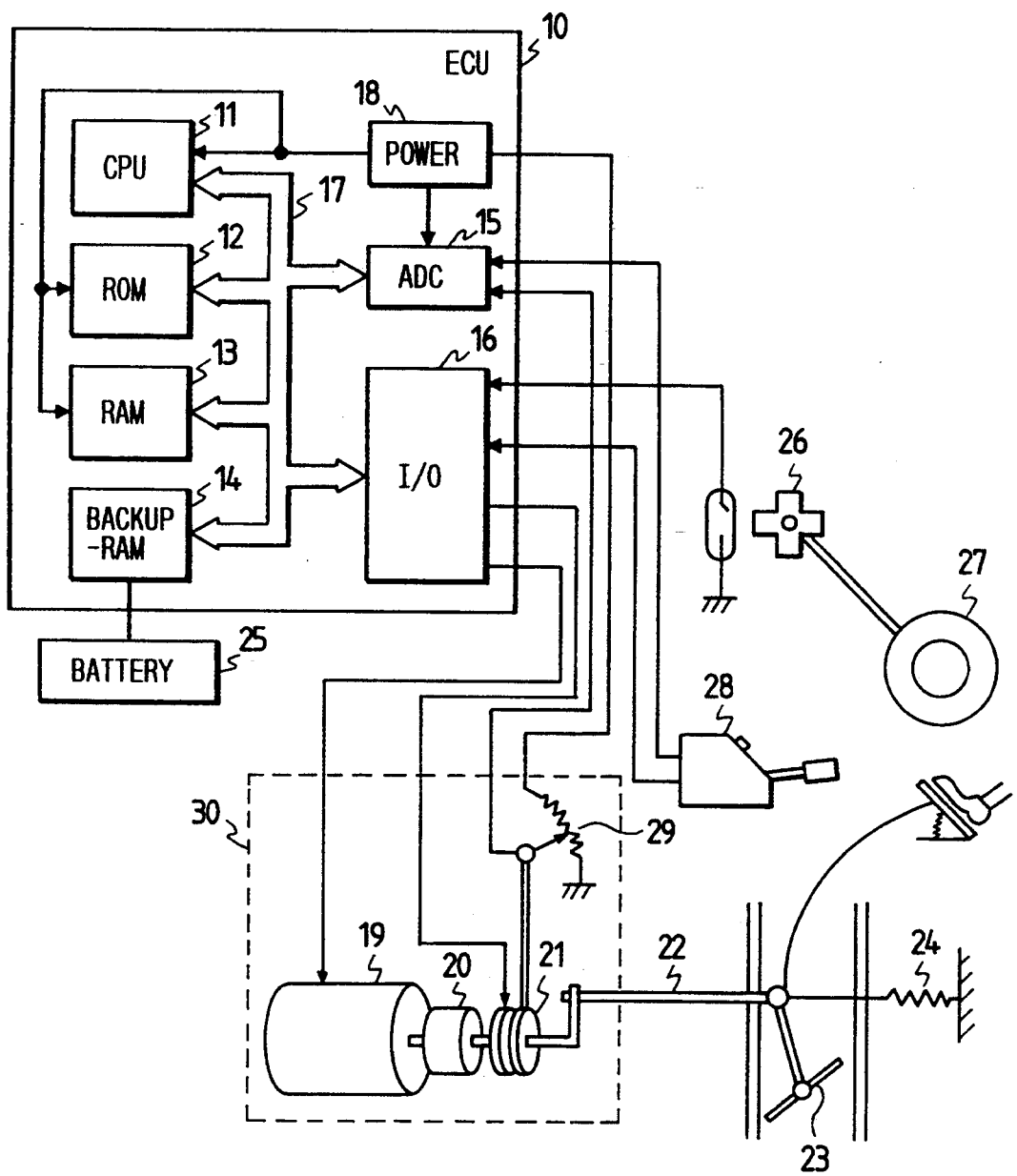
FIG. 1 is a block diagram showing an arrangement of a speed control system according to an embodiment of the present invention which is incorporated into motor vehicle.

Referring now to FIG. 1, a description will be made hereinbelow in terms of an arrangement of a vehicle speed control system according to an embodiment of the present invention. In FIG. 1, designated at numeral 10 is an electronic control unit (ECU) comprising a central processing unit (CPU) 11, a read-only memory (ROM) 12, a random access memory (RAM) 13, a backup RAM 14, an analog-to-digital converter (ADC) 15 and an input/output port (I/O) 16 which are coupled through a common bus 17 to each other. The ECU 10 is further equipped with a constant-voltage regulated power supply 18 for supplying a constant voltage to the CPU 11, ROM 12, RAM 13 and ADC 15. The backup RAM 14 is arranged to receive a constant voltage from an external battery 25 of the motor vehicle whereby the contents stored can be maintained irrespective of the turning-off of an ignition switch of the motor vehicle.

Further, designated at numeral 30 is an actuator for driving a throttle valve 23 at the time of cruising speed control operation to adjust the supply quantity of intake air to an engine (not shown). This actuator 30 is provided with an electric motor 19, a reduction gear 20, a clutch 21 and an actuator position sensor 29 and is connected through a link mechanism 22 to the throttle valve 23. Further, under the cruising control the clutch 21 takes the connecting state in response to a signal from the ECU 10 and the motor 19 rotates in response to a drive signal (duty signal) from the ECU 10, thereby driving the throttle valve 23. The actuator position sensor 29 is connected to the clutch 21 to detect the opening degree of the throttle valve 23. Thus, with the actuator position sensor 29, it is possible to detect the throttle opening degree despite the absence of a throttle sensor in the motor vehicle. Here, it is appropriate that the actuator position sensor 29 is attached to the reduction gear 20. Numeral 24 represents a return spring whereby the throttle valve 23 can take the fully closed state when the clutch 21 takes the non-connecting state.

Figure 3:
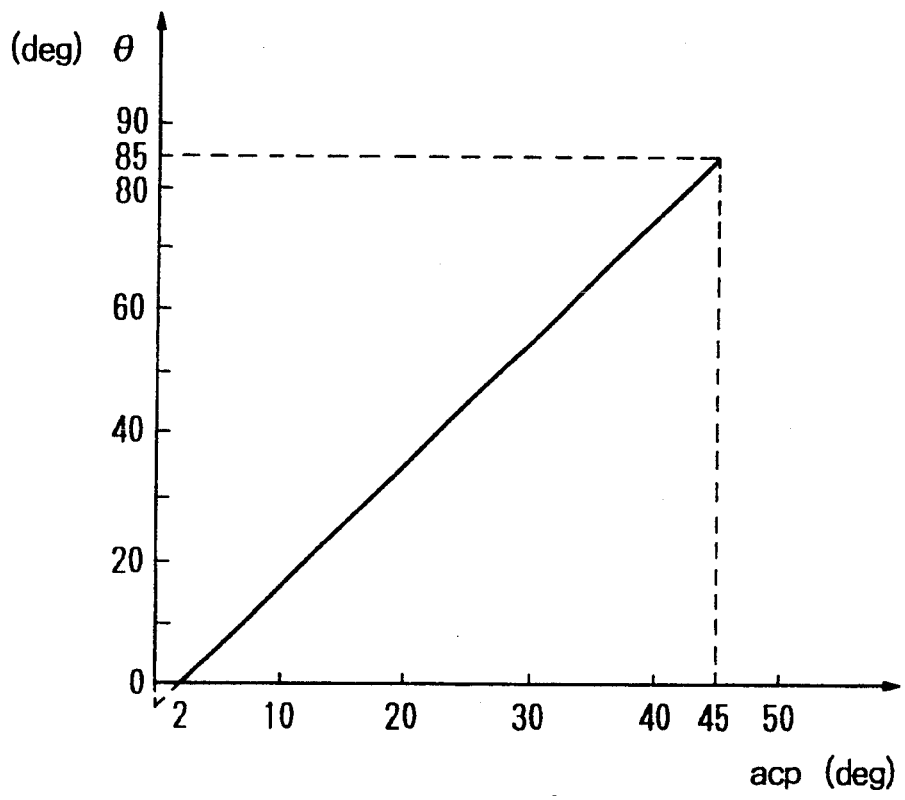
FIG. 3 is a graphic illustration for describing the relation between an actuator position and a throttle opening degree.

FIG. 3 shows the relation between the actuator position acp and the throttle opening degree Ta ($\theta$). As obvious from FIG. 3, when acp=2 (deg.), Ta=0 (deg.). This means that the throttle valve 23 takes the fully closed position when the actuator position acp is the fully closed position, thereby preventing a runaway. Further, when acp=45 (deg.), that is, even if the actuator position acp is the fully open position, the throttle valve 23 is arranged so as not to take the fully open position, thereby preventing the damage of a stopper of the throttle valve 23.

The throttle opening degree Ta can be calculated in accordance with the following equation:

$$Ta = 85/43 \, (acp-2) \quad (1)$$

Returning again to FIG. 1, a vehicle speed sensor 26 is provided in order to detect the speed of the motor vehicle on the basis of the rotation of a non-driven wheel 27 of the motor vehicle. A command unit 28 comprising a main switch (s/w), a set switch, a resuming switch, a cancelling switch and others is also provided to deliver the requirement of the vehicle driver to the ECU 10. In this embodiment, in the case that the main switch takes the ON state, when the driver depresses the set switch during the travelling of the motor vehicle, the vehicle speed at the time of the set switch depression is set as a target vehicle speed and the actual vehicle speed is feedback-controlled so as to approach the target vehicle speed.

Figure 2:
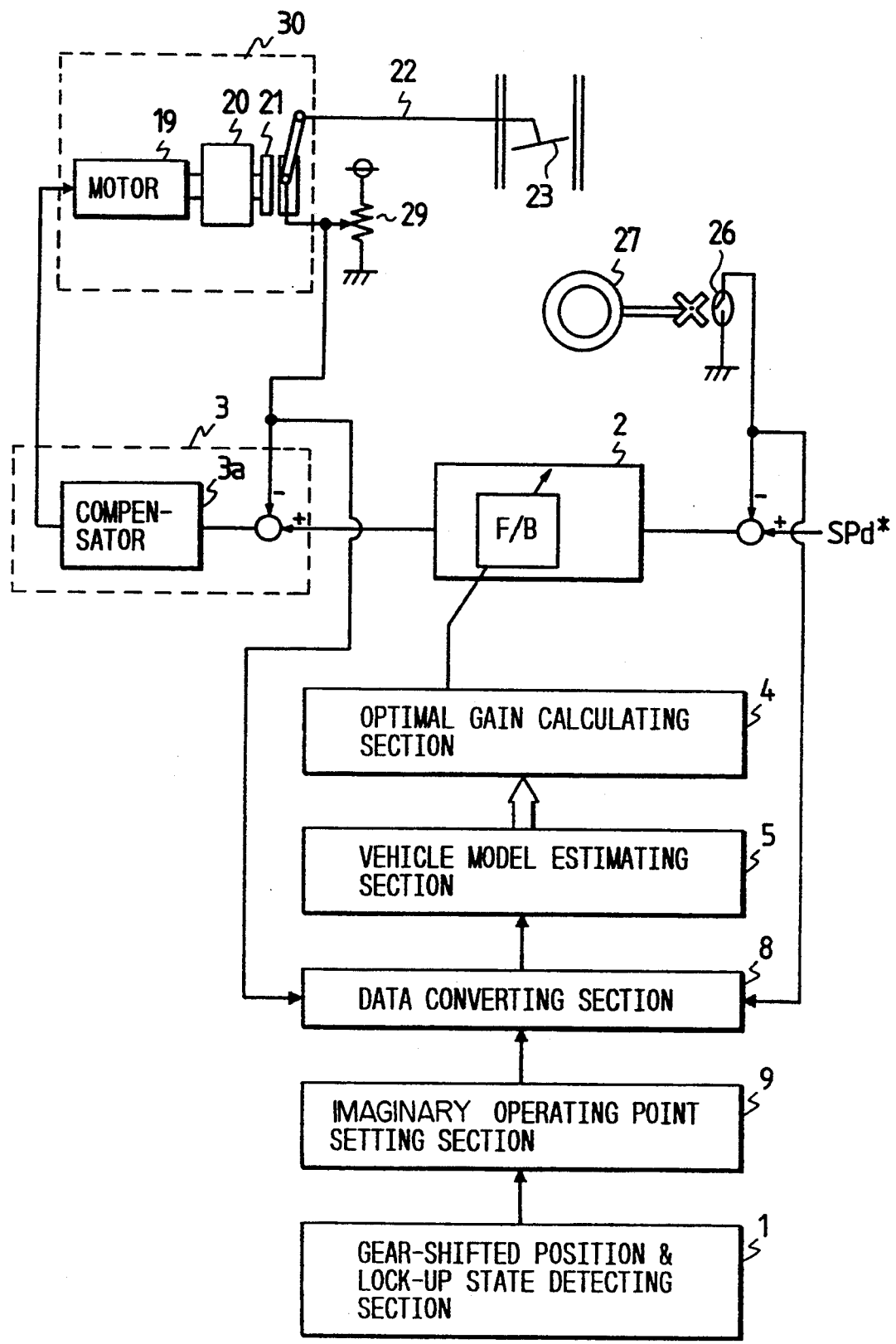
FIG. 2 is a block diagram for describing functions of an electronic control unit of the speed control system of the embodiment of this invention.

FIG. 2 shows an arrangement of a control system. In this embodiment, to a basic cruising control system there is added a self-tuning mechanism in which the vehicle model is successively estimated on the basis of the actuator position and the variation of the vehicle speed so as to calculate and update the optimal feedback gain (F/G). Here, although in this embodiment a PI compensator is used for the constant-speed control system, it is appropriate to use a PID compensator or a PD compensator. The control system will be described hereinbelow.

Figure 5:
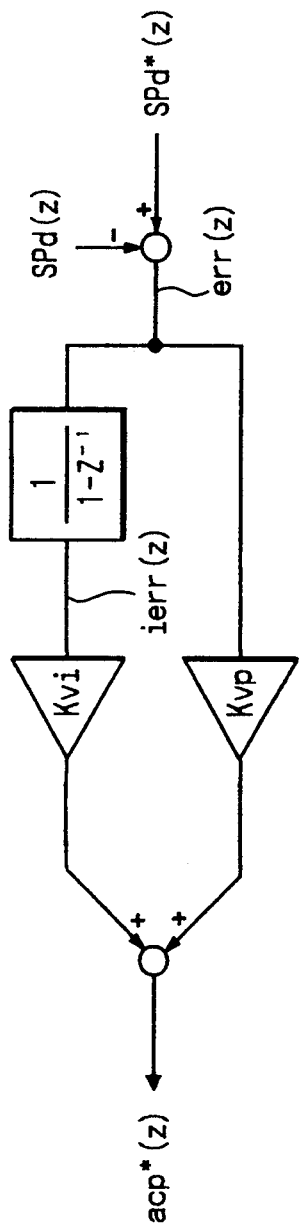
FIG. 5 is a block diagram showing a vehicle speed servo system in this invention.

In FIG. 2, numeral 2 represents a compensator for the cruising F/B control (vehicle speed servo operation) which constitutes a PI compensator. When the vehicle driver depresses the set switch, the vehicle speed on that occasion is set as the target vehicle speed spd* and the target actuator position acp* is calculated on the basis of the deviation err between the actual vehicle speed spd and the target vehicle speed spd* so that the deviation err becomes zero on the basis of the proportional term and the integral term. FIG. 5 is a block diagram showing the compensator 2 shown with a discrete-value system. In FIG. 5, $1/(1-z^{-1})$ represents an integrator for integrating the deviation err, $z^{-1}$ of $1/(1-$ $z^{-1}$) being a lag operator. Further, Kvi and Kvp respectively represent the integral gain and the target actuator position proportional gain. At the sample time k, the deviation, the integration and the are respectively expressed by the following equation.

Deviation: err (k)=spd* (k)−spd (k)  (2)

Integration: ierr (k)=ierr (k−1)+err (k)  (3)

Target Actuator position: acp* (k)=Kvp· err (k)+Kvi · ierr (k)+opacp  (4)

where opacp represents the operating point (offset) of the actuator side.

Figure 4:
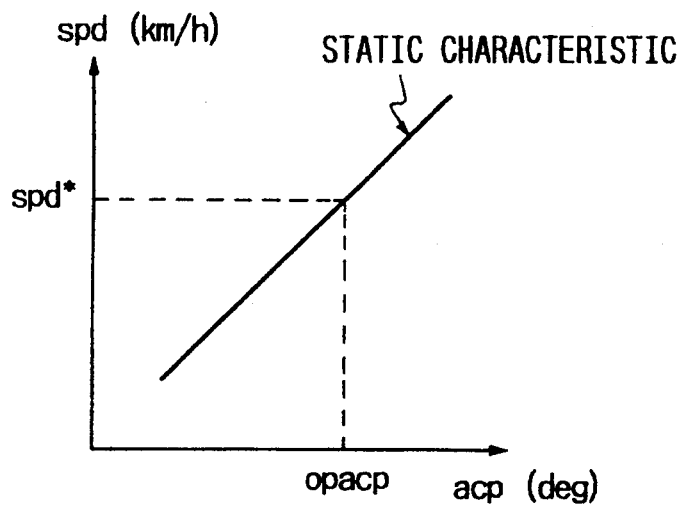
FIG. 4 is a graphic illustration for describing a static characteristic of a vehicle speed with respect to the actuator position.

FIG. 4 shows the static characteristic of the vehicle speed spd with respect to the actuator position acp when the transmission of the motor vehicle takes the fourth position and the motor vehicle is running on a flat road surface. When the target vehicle speed spd* is set, the actuator position acp corresponding thereto becomes the offset opacp. That is, at the time of start of the cruising control, the target actuator position acp* is arranged to become the offset value opacp so as to prevent the vehicle speed spd from slowing down, and the actuator 30 is quickly set to the optimal position. This static characteristic is previously stored as a table data in the ROM 12 of the ECU 10 and calculated with the linear interpolation. Further, at the time of the start of the cruising control, the initial value of the integration value ierr (k) is obtained by inversely operating the above-mentioned equation (4) so that the target actuator position acp* becomes the offset value. That is, ierr (k)=1/Kvi {acp*−Kvp· err (k)−opacp}  (5)

Here, in the case of acp*=opacp, the initial value ierr is set to 0 because of the deviation err=0. That is, in the aforementioned equation (5), it is possible to set a desired offset (the initial target actuator position) to acp*.

Furthermore, the target actuator position acp* is limited to a range of 0<acp*<45 (deg.), and when the calculated target actuator position acp* is out of the range, the integration value ierr is reset in accordance with the equation (5).

Referring again to FIG. 2, numeral 3 designates an actuator position servo system. The F/B system is constructed so that the actual actuator position acp becomes the target actuator position acp*. In this embodiment, a PD control compensator 3a is used as the actuator servo system compensator. This reason is that although the steady deviation becomes zero when introducing the integral term is obvious from the internal model principle in the control theory, in the case that the non-linear factors such as the hysteresis and the statical friction of a rod or mechanical system occur, the control based on the integral term becomes difficult. In the case of the cruising control, in addition to the controllability of the vehicle speed, the feeling of the vehicle to the driver becomes important, and therefore the entire controllability greatly depends upon the controllability of the actuator position servo system. Here, controllability is not taken into account, it is also possible to perform the P control or PID control through the compensator 3a.

Figure 6:
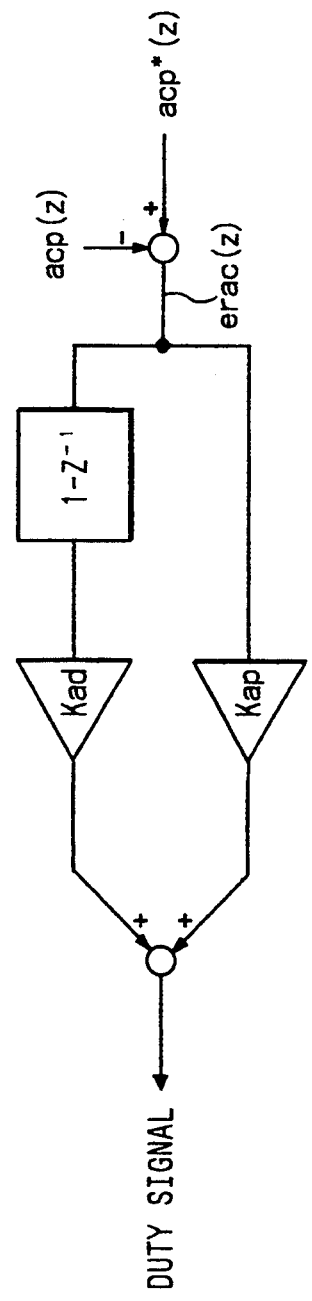
FIG. 6 is a block diagram showing an actuator position servo system in this invention.

FIG. 6 is a block diagram showing the actuator position servo system. A drive duty signal is calculated by effecting the multiplication of gains with respect to the proportional term and differential term of the deviation erac between the target actuator position acp* and the actual actuator position acp which is the output of the compensator 2. When this calculation value is positive, the motor 19 is driven in the forward direction, and when it is negative, the motor 19 is driven in the reverse direction. The absolute value of the calculation value is the duty ratio. In this embodiment, the basic period is set to 25 ms whereby the duty signal and the actuator position acp can take the widest linear regions. The calculation equations at the sample time k are as follows.

Deviation: erac (k)=acp* (k)−acp (k)  (6)

Duty: duty (k)=Kap· erac (k)+Kad·(erac (k)−erac (k−1))  (7)

Transistor ON Time for Driving Motor:

$$\text{OnTime} = \frac{|\text{duty}|}{100} \cdot 25(\text{ms}) \quad (8)$$

Here, the reason that the control system is divided into the vehicle speed servo system which is the main system and the actuator position servo system which is the minor system is that, since the actuator system is considerably affected by non-linear factors such as the statical friction and looseness of the mechanical system as compared with the vehicle system, the minor servo system is constructed so that the non-linear portion becomes as linear as possible to prevent the non-linear factors from affecting the entire servo system. Further, for changing only the actuator, this arrangement allows only the minor servo system to be adapted thereto, thereby reducing the changing steps.

Secondly, a description will be made hereinbelow in terms of the self-tuning mechanism. The self-tuning mechanism comprises a vehicle model estimating section 5 for estimating a vehicle model using the input and output information relating to the motor vehicle and an optical feedback gain calculating section 4 for calculating an optimal F/B gain on the basis of the parameters of the estimated vehicle model so that a desired response can be obtained. Although in this embodiment the actuator position and the vehicle speed are used as the input and output information, it is appropriate to use the throttle opening degree and the vehicle speed.

First, the description will be made in terms of the vehicle model estimating section 5. In this embodiment, the recursive least squares method is used for the on-line estimation of the vehicle model. The on-line identification method of the vehicle model based on the the recursive least squares method is described in detail in documents such as "Digital Control" (1985) written by Yasuto Takahashi and published by Iwanami Shoten. Accordingly, a brief description will be made hereinbelow in terms of the on-line identification method. The vehicle model to be estimated is the dynamic characteristic of the variation of the vehicle speed with respect to the variation of the actuator position (throttle opening degree). Here, the vehicle model can be expressed with the following transfer function Gv (s).

$$Gv(s) = \frac{K}{1 + \tau s} = \frac{spd(s)}{acp(s)} \qquad (9)$$

where z represents a time constant and K designates a gain.

Figure 7:
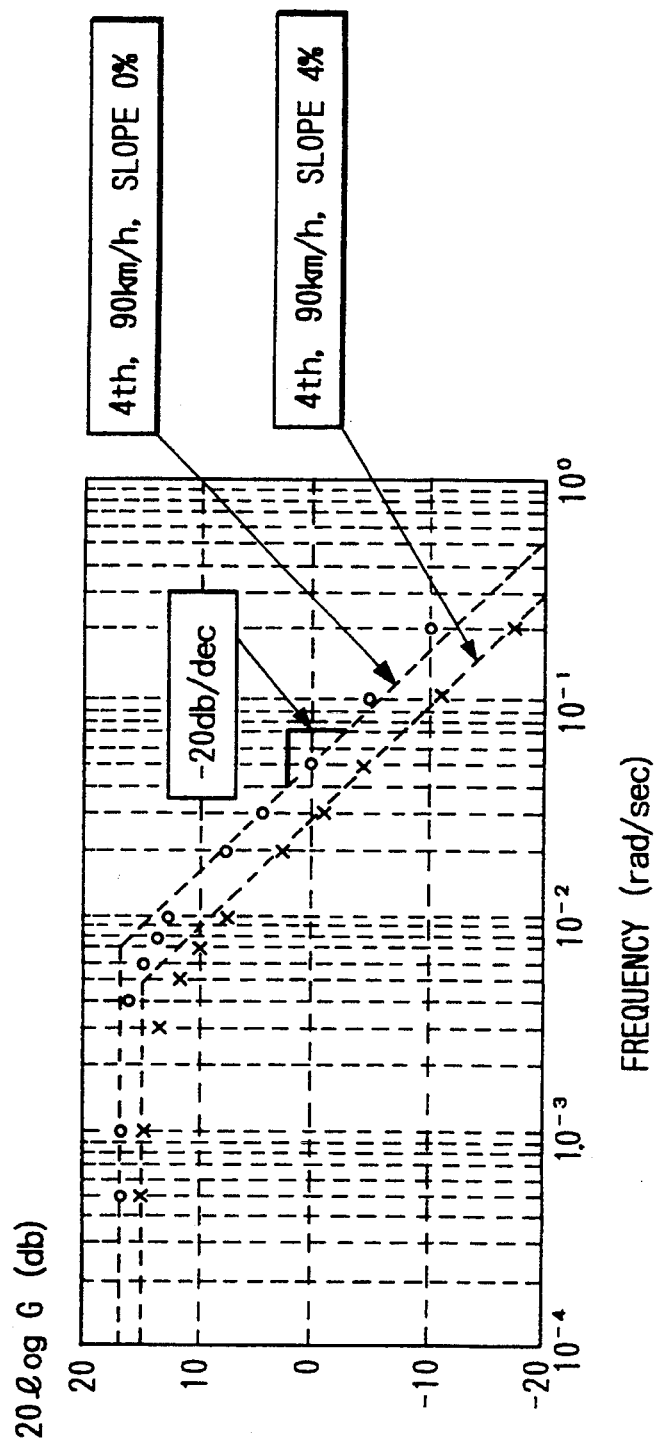
FIG. 7 is a graphic illustration for describing the frequency characteristic of a motor vehicle under a predetermined travelling condition of the motor vehicle.

Actually, including the engine (E/G), the transmission and others, makes the vehicle model a higher-order model. However, the influence of the vehicle weight is great, and therefore the vehicle model necessary for the cruising control can be approximated to the first-order model. FIG. 7 shows the measurement result of the frequency characteristic of the motor vehicle in the case that the gear in the transmission takes the fourth position, the vehicle speed is 90 km/h and the slope is 0% and 4%. Here, −20db/dec corresponds to the first-order model characteristic.

For treating the aforementioned equation (9) by the ECU 10, the equation (9) becomes as follows when being expressed with the discrete-value system.

$$Gv(z) = \frac{bz^{-1}}{1 - az^{-1}} \qquad (10)$$

where $z^{-1}$ is an operator indicative of the lag of one sample time.

The relation to the continuous system transfer function Gv (s) is as follows.

$$a = \exp(-T/\tau) \qquad (11)$$

$$b = K\{1 - \exp(-T/\tau)\} \qquad (12)$$

where T represents the sampling time and, for example, set to T=0.16s.

Figure 8:
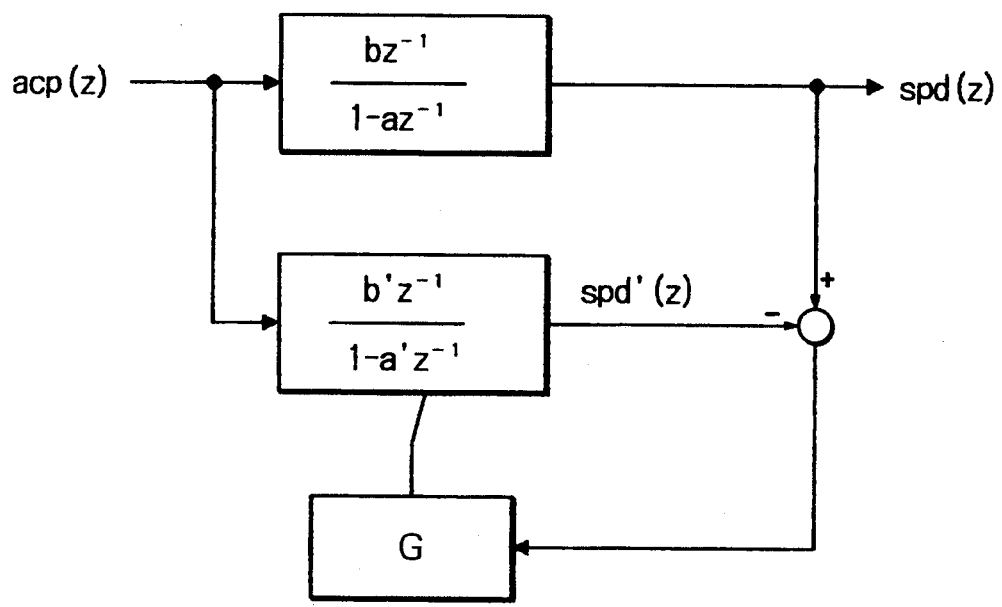
FIG. 8 is a block diagram for describing an estimation method of a vehicle model.

FIG. 8 is a conceptive illustration of the recursive least squares method. That is, when placing an estimation model having the same configuration as the vehicle model and giving the same input (actuator position acp) to both the vehicle model and the estimation model, if $a \neq a\alpha$ and $b \neq b'$, a deviation (model error) occurs between the actual output (vehicle speed spd) and the model output spd'. According to the recursive least squares method, the model parameters a' and b' are successively updated by the gain vector so that this deviation becomes zero.

Thus, the model parameters a' and b' to be estimated are replaced with the following vector configuration.

$$F^t = (a', b') \qquad (13)$$

Further, the control input and output quantities (the actuator position acp and the vehicle speed spd) are also replaced with the following vector configuration.

$$X^t(k) = [acp(k-1), spd(k-1)] \qquad (14)$$

where the superscript t represents a transposed matrix. With the above expression, the estimation value F' of F becomes as follows.

$$F'(k) = F'(k-1) + G(k) \cdot \{espd(k) - espd'(k)\} \qquad (15)$$

where $$G(k) = \frac{1}{wD} H(k-1)X(k) \text{ (gain vector)} \qquad (16)$$

$$espd'(k) = X^t(k)F(k-1) \text{ (model output)} \qquad (17)$$

Here, w is a positive weighting below 1 and, as w becomes closer to 1, the convergence speed of the parameter becomes slower and the strength for noises becomes more increased. In this embodiment, w is set to 0.98.

Further, D and H (k) can be given in accordance with the following equations.

$$D = 1 + X^t(k) \frac{1}{W} H(k-1)X(k) \qquad (18)$$

$$H(k) = \frac{1}{W} \{I - G(k)X^t(k)\}H(k-1) \qquad (19)$$

where I represent a unit matrix.

Thus, it is possible to estimate the model parameters a' and b' in accordance with the aforementioned equation (15).

This on-line identification will be described hereinbelow with reference to a flow chart of FIG. 9. The initial setting is effected at the time of the depression of the set switch. The flow chart shows only a series of calculation procedures to be executed at every estimation period. In this embodiment, the estimation period is set to 0.16s which is equal to the control period. This is because the estimation period is arranged to be shorter than the vehicle time constant of about 10 to 30s and the timing can easily be taken when being equal to the control period. Here, although the arrangement of the control system becomes complicated, it is also possible to set the estimation period to a value different from that of the control period.

Figure 9:
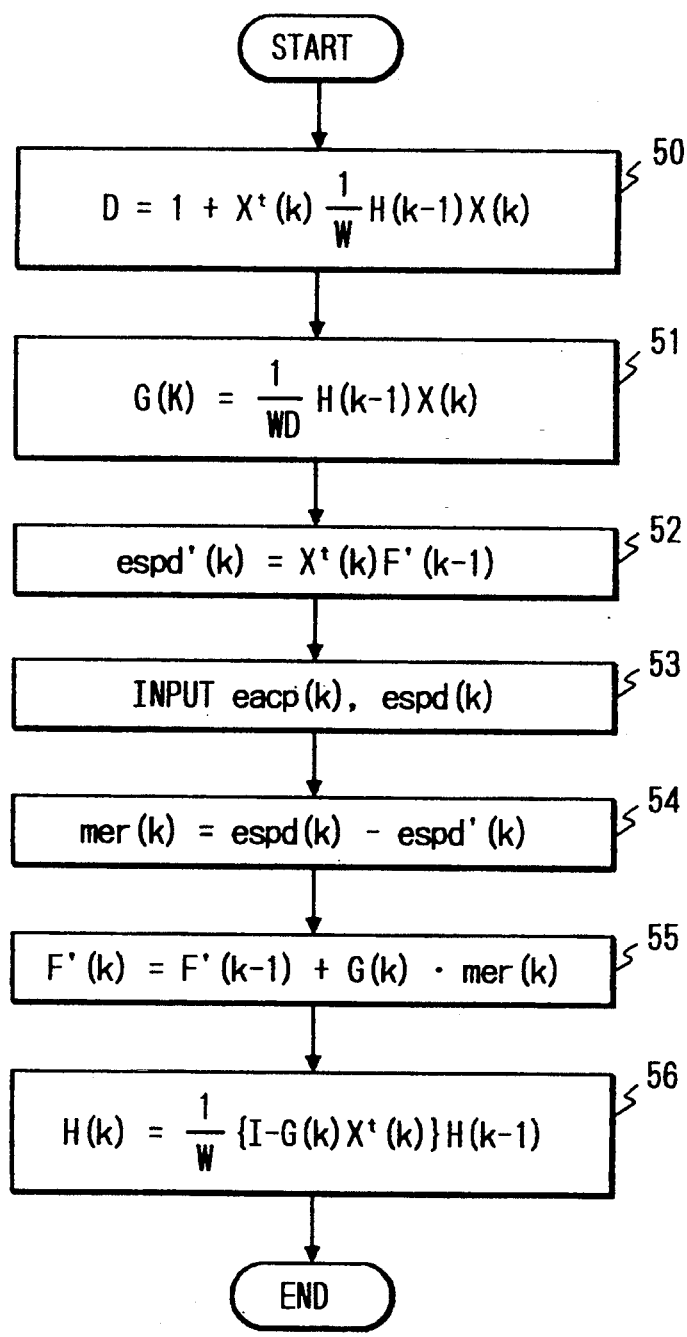
FIG. 9 is a flow chart showing a procedure of estimation of the vehicle model.

In FIG. 9, a step 50 is executed in order to calculate D in accordance with the above-mentioned equation (18). Here, H (k−1) in the equation (18) is the value calculated at the previous sampling time. Then, a step 51 is executed to calculate the vector gain G in accordance with the above-mentioned equation (16) and a step 52 is effected to calculate the present predictive model output espd' on the basis of the previous input and output amount and estimation parameter in accordance with the equation (17). Further, a step 53 inputs as the input and output of the vehicle, the latest data (eacp, espd) obtained due to the conversion of the actually measured data made in terms of (on the basis of) an imaginary operating point (which will be described hereinafter). Step 54 obtains an estimation error (mer (k)) of the model, and further followed by a step 55 updates the estimation value F' (k) by adding the value, obtained by multiplying the gain vector G by the error mer (k), to the previous estimation value F' (k−1). Finally, a step 56 is executed to calculate H in accordance with the equation (19) for the next calculation.

Further, a description will be made hereinbelow in terms of a calculation method of the F/B gain in the optimal gain calculating section 4. Although the F/B gain can be calculated in accordance with two methods: a method based on the evaluation function and a method based on the pole placement, in this embodiment the F/B gain is calculated in accordance with the pole placement method. The pole placement method is a method of applying the fact that the response characteristic of the F/B system one-to-one-corresponds to the position of the pole of the F/B system to perform the reverse calculation of the gain by designating the pole corresponding to a desired response.

Figure 10:
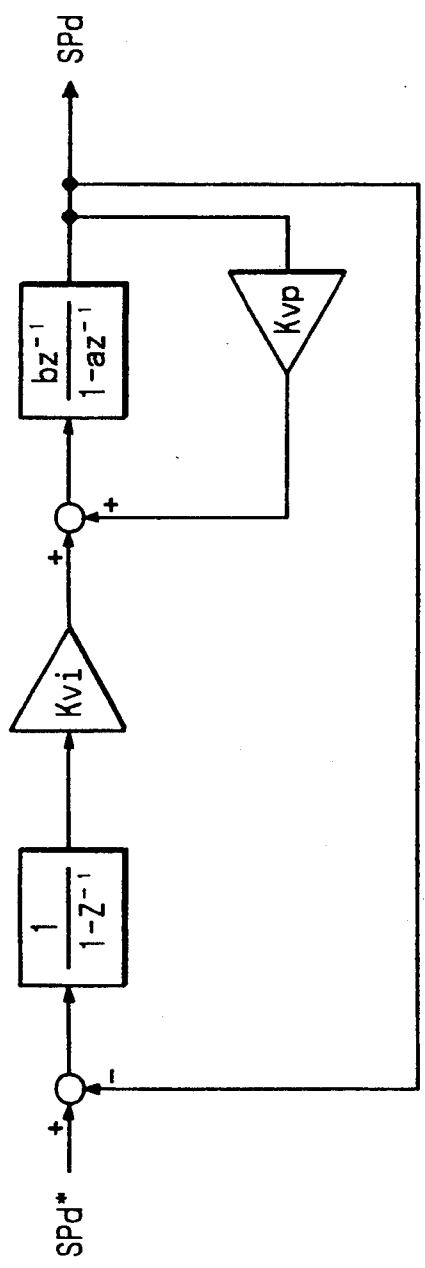
FIG. 10 is a block diagram showing a control system in this embodiment.
Figure 11:
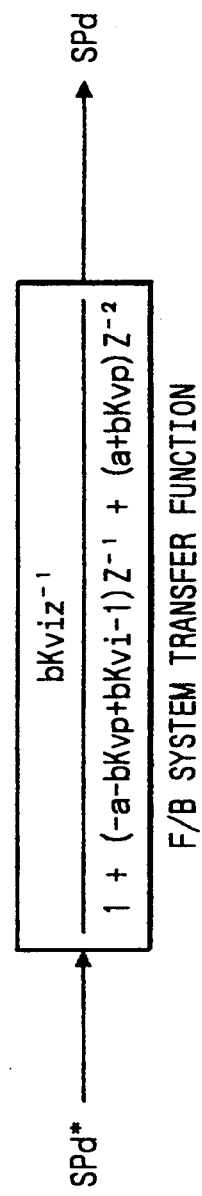
FIG. 11 is a block diagram showing a transfer function in a feedback system.

FIG. 10 is a block diagram showing the control system in this embodiment. Here, Kvi represents a gain for the integral term and Kvp is a gain for the proportional term. That is, the optimal gains Kvi and Kvp are obtained on the basis of the estimation parameter obtained by the vehicle model estimation section 5. First, the F/B system transfer function as shown in FIG. 11 (the equation (20) is obtained by arranging the block diagram of FIG. 10.

$$G_{F/B} = \frac{spd(z)}{spd^*(Z)} = \frac{bKviz^{-1}}{1 + (-a - bKvp + bKvi - 1)z^{-1} + (a + bKvp)z^{-2}} \quad (20)$$

In this equation (20), the denominator is the characteristic equation of the F/B system and the root thereof is the pole of the F/B system whereby the response can singly be obtained.

Thus, the characteristic equation is as follows.

$$z^2 + (-a - bKvp + bKvi - 1)z + (a + bKvp) = 0 \quad (21)$$

Here, if $z^2 + \alpha z + \alpha_2 = 0$, $$\alpha_1 = -a - bKvp + bKvi - 1 \quad \alpha_2 < a + bKvp \quad (22)$$

accordingly, $$Kvi = \frac{1 + \alpha_1 + \alpha_2}{b} \quad (23)$$

$$Kvp = \frac{-a + \alpha_2}{b}$$

That is, if obtaining $\alpha_1$ and $\alpha_2$, the gains Kvi and Kvp can be calculated on the basis of the estimation parameters a and b.

Figure 12:
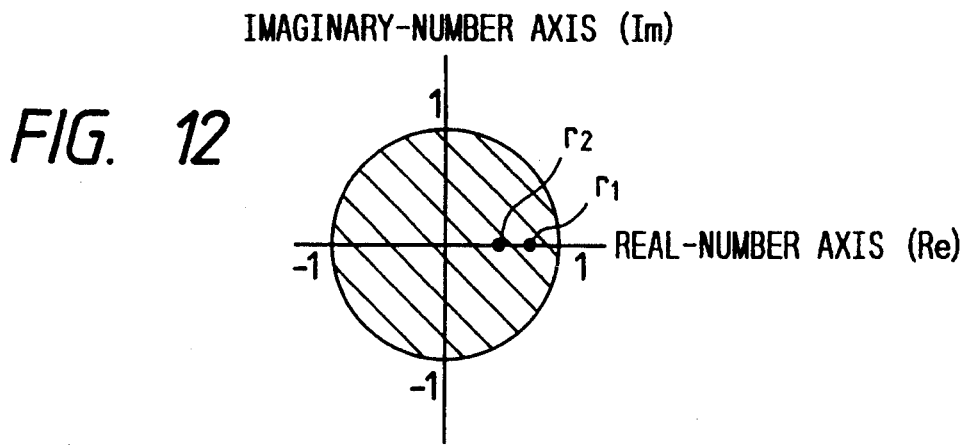
FIG. 12 is an illustration of two real roots in the pole placement method.
Figure 13:
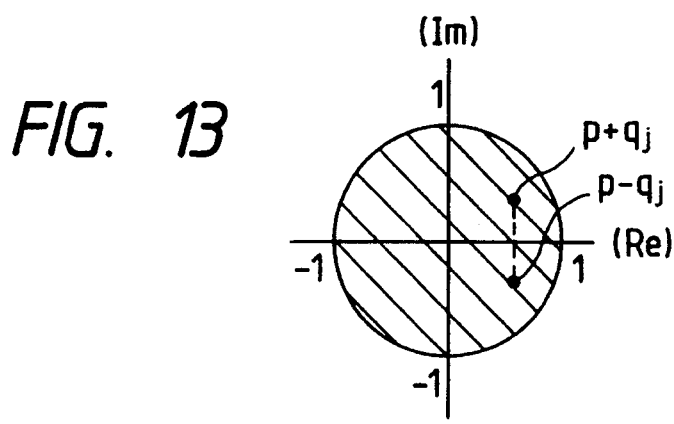
FIG. 13 is an illustration of a set of conjugate complex roots in the pole placement method.

In this embodiment, since the characteristic equation is a quadratic equation, the number of poles becomes two. Further, the two poles take two cases: two real roots and a set of conjugate complex roots. Here, since the pole can be expressed on the z-plane in the case of the discrete-value system, as illustrated in FIGS. 12 and 13, the pole is placed in a unit circle having a radius of 1 with respect to the original point. With the pole being in the unit circle, it is possible to ensure the stability of the control system.

1) In the case of two real roots when $z = r_1, r_2$, the characteristic equation becomes $(z - r_1)(z - r_2) = 0$, thereby resulting in $z^2 + (-r_1 - r_2)z + r_1 r_2 = 0$.

Thus, $$\alpha_1 = -r_1 - r_2 \quad \alpha_2 = -r_1 r_2 \quad (24)$$

2) In the case of a set of conjugate complex roots If $z = p + qj$ ($j^2 = -1$: imaginary number), the characteristic equation becomes $(z - p - qj)(z - p + qj) = 0$, thereby resulting in $z^2 - 2pz + (p^2 + q^2) = 0$.

Accordingly, $$\alpha_1 = -2p \quad \alpha_2 = p^2 + q^2 \quad (25)$$

Figure 14:
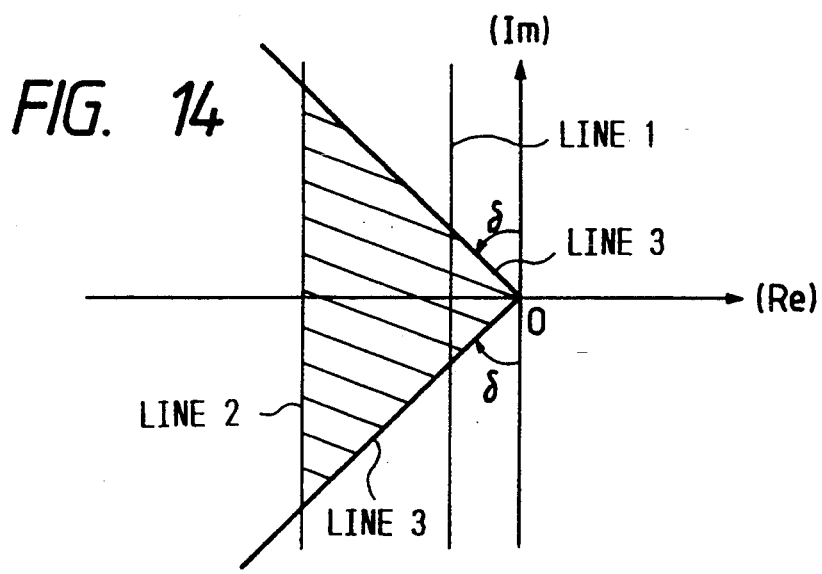
FIG. 14 is a characteristic diagram showing the range of the root in the pole placement method.

Secondly, a description will be made hereinbelow in terms of the designation of the root for the vehicle speed servo system. In this embodiment, the root is obtained so that a desired behavior is taken in the continuous system, and the obtained root is converted into a discrete value so as to place the root in the discrete-value system. If in the continuous system the pole exists at the left opposite side, the stability of that control system can be ensured. The root range where the control system in the continuous system takes the desired behavior can generally be shown by the oblique line portion in FIG. 14. In FIG. 14, a restriction is made in the real-number axis directions in terms of the line 1. Since the response becomes quicker as it becomes greater in the negative direction, it is required to be at the left side of the line 1 on account of the control specification, acceleration feeling and other factors. Further, because of the torque saturation and others, it is impossible for the root to be placed at the left side of a line 2. Still further, lines 3 are lines drawn so as to pass through the original point and take an angle δ with respect to the imaginary-number axis, and the overshoot amount becomes larger as the angle δ becomes smaller (this angle δ is so-called a damping coefficient). That is, it is restricted between the lines 3. Since in the cruising control a quick response is required without the overshooting, the damping coefficient δ is preferable to be close to 1. In this embodiment, two real-number poles are taken so as not to prevent the overshooting $$s_1 = -0.177$$
$$s_2 = -1.44$$

These are poles allowing the statical determination for about 10 seconds in response to the 1 km/h step change command.

For the conversion to the poles in the discrete-value system, these may be substituted into $z = e^{TS}$ where T represents the sampling time and set to 0.16s in this embodiment. That is, $$r_1 = 0.972$$
$$r_2 = 0.794$$

Since these exist in the unit circle on the z plane, the control system becomes stable. Thus, in accordance with the above-mentioned equations (24) and (23), it is possible to calculate the F/B gains Kvi and Kvp.

The self-tuning function in the cruising control system can be realized in accordance with the above-described method.

Figure 15:
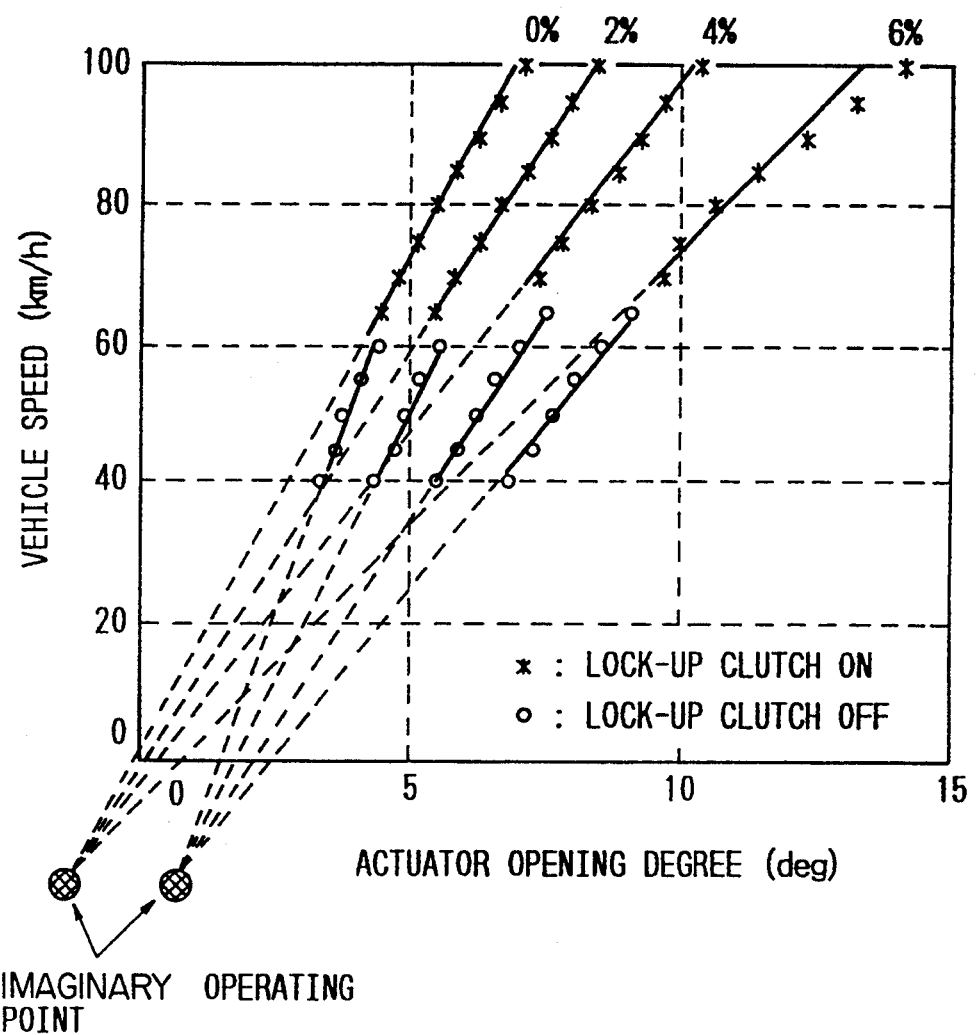
FIG. 15 is a characteristic diagram showing variation of the static characteristic of a motor vehicle with respect to variation of the road surface slope.

A description of the above-mentioned imaginary operating point will be made hereinbelow. In the case of estimating the model parameters a' and b', the vehicle speed spd and the actuator position acp corresponding to the throttle opening degree are required to be divided into the operating point, which is one point of the static characteristic, and the variation amount from the operating point, because the model parameters a' and b' are parameters for obtaining the dynamic characteristic of the motor vehicle and the dynamic characteristic thereof can accurately be obtained when only the data due to the variation amount is taken as the control input and output amount. However, the aforementioned operating point varies not only by the differences between vehicle constituting elements such as the vehicle weight, engine type and the transmission but also by the disturbance such as the slope of the road surface and the weather (for example, the strength of wind), and therefore, in the case of not having a sensor or the like possible to detect the disturbance which always varies, it is impossible to detect the variation amount from the operating point since the variation of the operating point is not detectable. Accordingly, in this embodiment, a point on the static characteristic (a group of operating points) which is not affected by the variation of the road surface slope (which is the greatest disturbance), i.e., the point in which a group of straight lines indicative of the static characteristic with respect to the respective road surface slopes intersect as shown in FIG. 15, is determined as the imaginary operating point. If the conversion into the data based on this imaginary operating point is made and the model parameters a' and b' are estimated on the basis of the converted data, it is possible to remove the effect of the variation of the operating point due to the variation of the road surface slope.

Here, a description will be made in terms of the setting method of the operating method and the data converting method based on the operating point. First, for setting the imaginary operating point, it is required to investigate the static characteristic of the motor vehicle. FIG. 15 shows the static characteristic obtained through a test on a chassis dynamo of a motor vehicle having a 6-cylinder gasoline engine. As obvious from FIG. 15, this static characteristic includes two characteristics: one is that, if the road surface slope is constant, the static characteristic can be approximated to a straight line under a specific vehicle condition such as when the transmission gear takes the fourth position and the lockup clutch is in the ON state. The other characteristic is that, when the road surface slope varies, a group of straight lines obtained in accordance with the slope variation intersect in one point which is set as the imaginary operating point. These two characteristics can be proven from the fact that the relation between the vehicle speed and the travelling resistance and the relation between the actuator position and the output torque in a small interval can respectively be approximated to straight lines and further from the fact that the relation between the actuator position and the output torque can generally be approximated to an exponential function.

Further, the value of the imaginary operating point varies in accordance with the gear-shifted position and the ON-OFF state of the lock-up clutch, and therefore the imaginary operating point is switched in response to signals indicative of the detected gear state and lock-up clutch state. This imaginary operating point can express a model equal to the conventional model at the vicinity of the operating point in terms of each road surface, and is not affected by the variation of the road surface slope.

In this embodiment, on the basis of the test on the chassis dynamo, the imaginary operating points (vopacp, vopspd) are set as follows:

(vopacp, vopspd) = (−1.5°, −15 km/h) when the gear takes the fourth position and the lock-up clutch takes the ON state;

(vopacp, vopspd) = (−0.7°, −15 km/h) when the gear takes the fourth position and the lock-up clutch takes the OFF state;

(vopacp, vopspd) = (−2.5°, −38.5 km/h) when the gear takes the third position and the lock-up clutch takes the ON state;

(vopacp, vopspd) = (−1.25°, −38.5 km/h) when the gear takes the third position and the lock-up clutch takes the OFF state; and (vopacp, vopspd) = (−7.0°, −46 km/h) when the gear takes the second or first position and the lock-up clutch takes the ON state.

Figure 21:
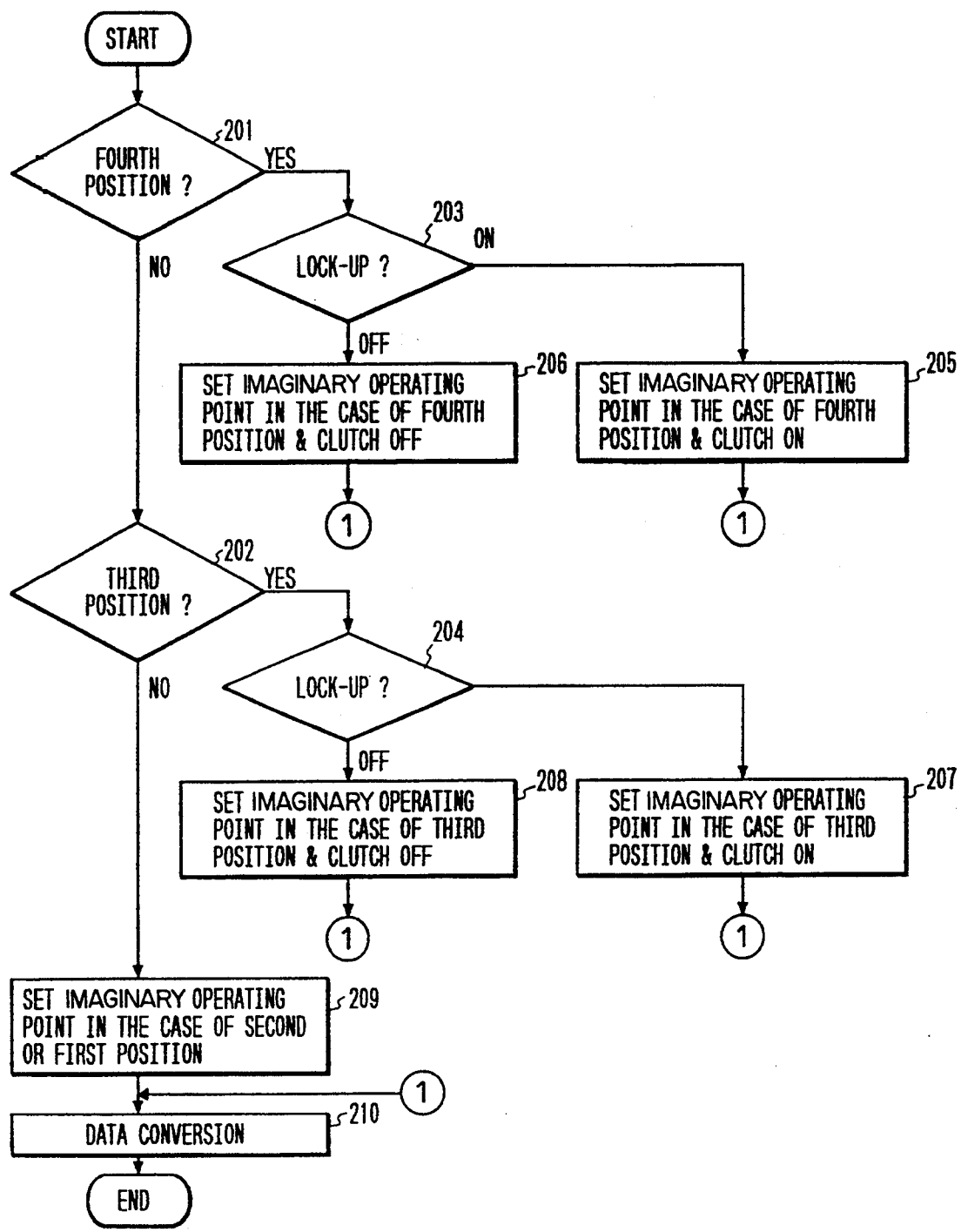
FIG. 21 is a flow chart showing a setting operation of an imaginary operating point.

FIG. 21 is a flow chart showing the setting means of the imaginary operating point. In FIG. 21, steps 200 to 204 are for checking the position of the transmission gear and the ON-OFF state of the lock-up clutch. In steps 205 to 208, the imaginary operating point is set in correspondence with each condition. A step 209 is for setting the imaginary operating point in the case that the transmission gear does not take the third and fourth positions, i.e., in the case that the transmission gear takes the second or first position. In a step 210, the actuator position and vehicle speed data (eacp, espd) to be used for estimating the parameter of the vehicle model on the basis of the set imaginative operating point are calculated in accordance with the following equation.

$$(eacp, espd) = (acp - vopacp, spd - vopspd) \quad (26)$$

where acp and spd represent the actually detected actuator position and vehicle speed, respectively.

Figure 16:
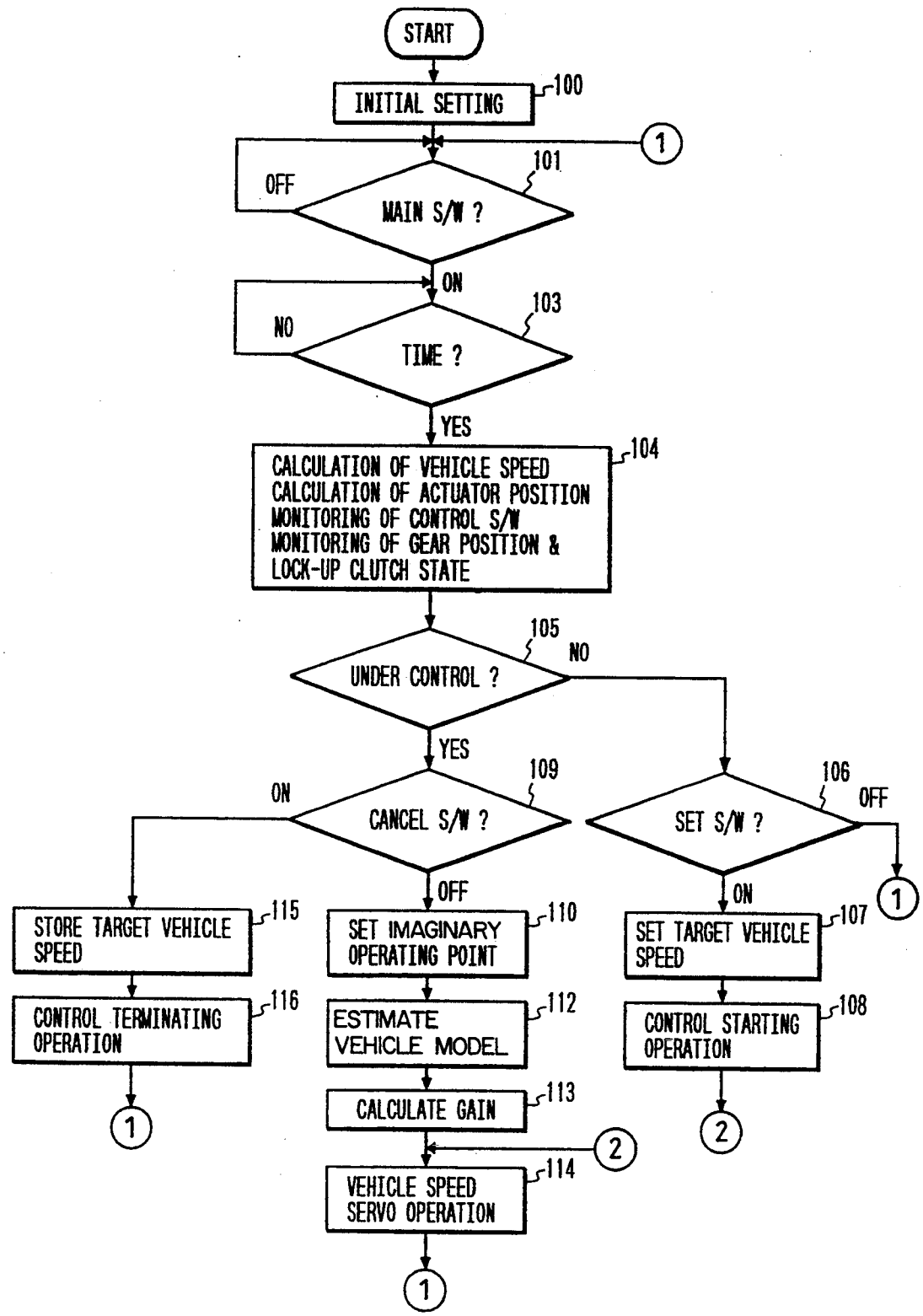
FIG. 16 is a flow chart showing a control operation to be executed in the embodiment of this invention.
Figure 17:
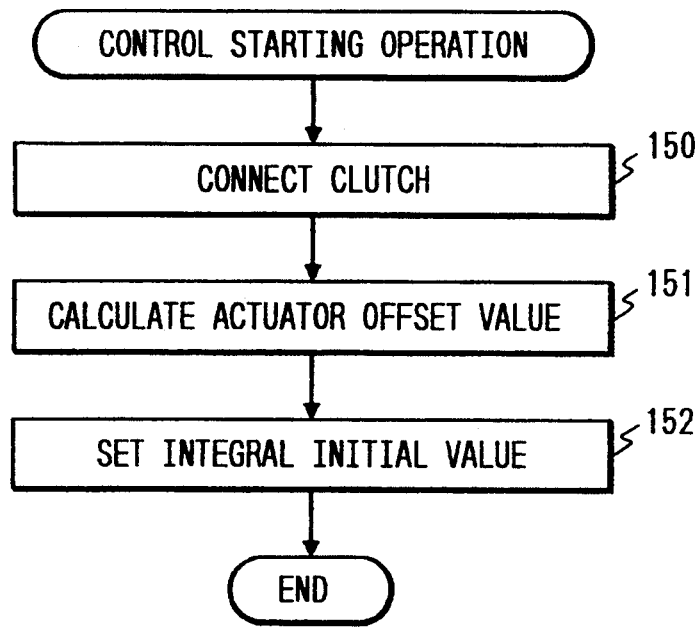
FIG. 17 is a flow chart showing a control starting operation.
Figure 18:
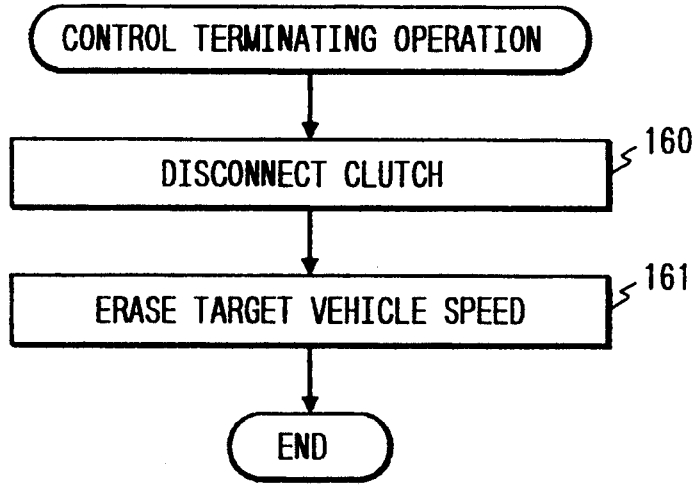
FIG. 18 is a flow chart showing a control terminating operation.
Figure 19:
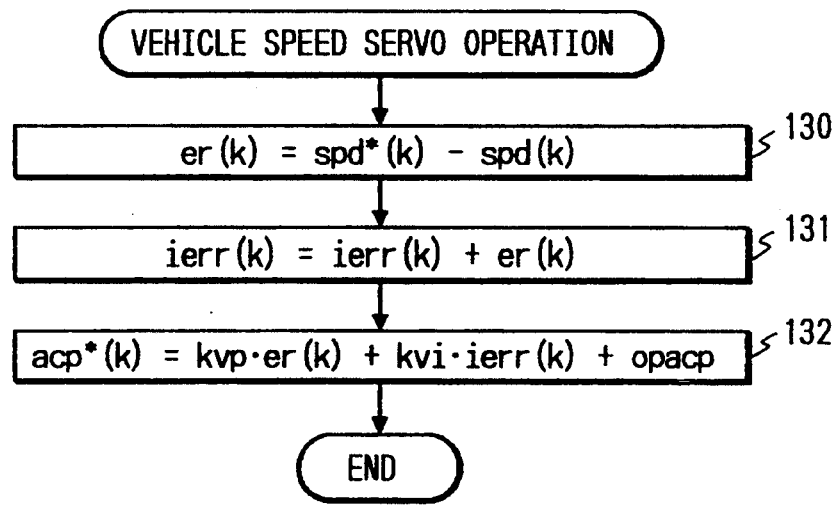
FIG. 19 is a flow chart showing a vehicle speed servo operation.
Figure 20:
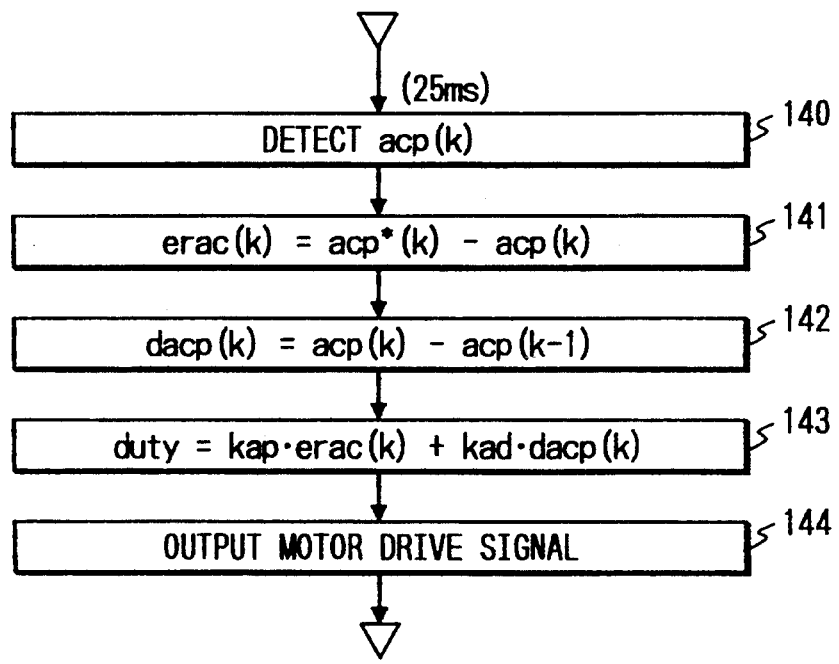
FIG. 20 is a flow chart showing an actuator position servo operation.

FIG. 16 is a flow chart showing the entire control operation including the vehicle speed control operation. This operation starts with a step 100 to set the initial values, then followed by a step 101 to check whether the main switch is in the ON or OFF state. If in the OFF state, the following operation is not executed. In the case that the main switch acts as a hardware switch for power supply to the ECU 10, this operation is not required. Subsequently, a step 103 follows to check whether the time corresponding to the control period is elapsed or not. Here, the control period is 160 ms. If "YES", a step 104 is executed to perform the calculation of the vehicle speed, the detections of the various control switches, the detection of the gear-shifted position and the detection of the lockup clutch state. The vehicle speed is calculated on the basis of the vehicle speed pulse separation (one revolution: 4 pulses) obtained in accordance with the vehicle speed pulse interrupt operation. After the execution of the step 104, a step 105 follows to check whether the motor vehicle is now under the control. If not under the control, a step 106 follows to detect the ON-OFF state of the set switch. If the set switch is in the OFF state, the operational flow returns to the step 101, and if it is in the ON state, a step 107 follows to set as a target vehicle speed the vehicle speed taken when the set switch has been depressed, then a step 108 to perform the control starting operation. As shown in a flow chart of FIG. 17, this control starting operation comprises steps 150 to 152 to perform the connection of the clutch 21, the calculation of the offset value of the actuator 30, the initial setting of the integral term and others. After the execution of the step 108, the operational flow goes to a step 114 to perform the vehicle speed servo operation (constant-speed travelling F/B control) and then returns to the step 101. On the other hand, if in the step 105 the motor vehicle is under the control, the operational flow advances to a step 109. The step 109 is for checking whether the cancel requirement is made through the operation of the cancel switch, the braking operation or the like. If not, the operational flow goes to a series of steps 110 to 114 for performing the setting of the imaginary operating point, the estimation of the vehicle model, the calculation of the gain, and the vehicle speed servo operation, and then returns to the step 101. On the other hand, if the cancel requirement is made, a step 115 is executed to store the current target vehicle speed for the purpose of the resuming and a step 116 is executed to perform the control terminating operation, thereafter returning to the step 101. As shown in a flow chart of FIG. 18, the control terminating operation comprises steps 160 and 161 to disconnect the clutch and erase the target vehicle speed. The imaginary operating point setting operation in the step 110 is effected in accordance with the flow chart of FIG. 21, the vehicle model estimating operation in the step 112 is effected in accordance with the flow chart of FIG. 9, and the gain calculation in the step 113 is effected in accordance with the above-mentioned equations 22 (23) and 21. Further, in the vehicle servo operation in the step 114, as illustrated in FIG. 19, the vehicle speed deviation err is calculated in a step 130, the deviation integration ierr is calculated in a step 131, and the target actuator position acp* is calculated in a step 132. A minor servo operation shown in FIG. 20 is executed at a different period (the basic duty interrupt period 25 ms) so that the actuator position flows the calculated target value. That is, the actuator position acp is obtained through the analog-to-digital (A/D) conversion in a step 140, the deviation erac and the deviation differentiation are calculated in steps 141 and 142, the drive duty is obtained in a step 143, and a motor drive signal is outputted in a step 144.

Figure 22:
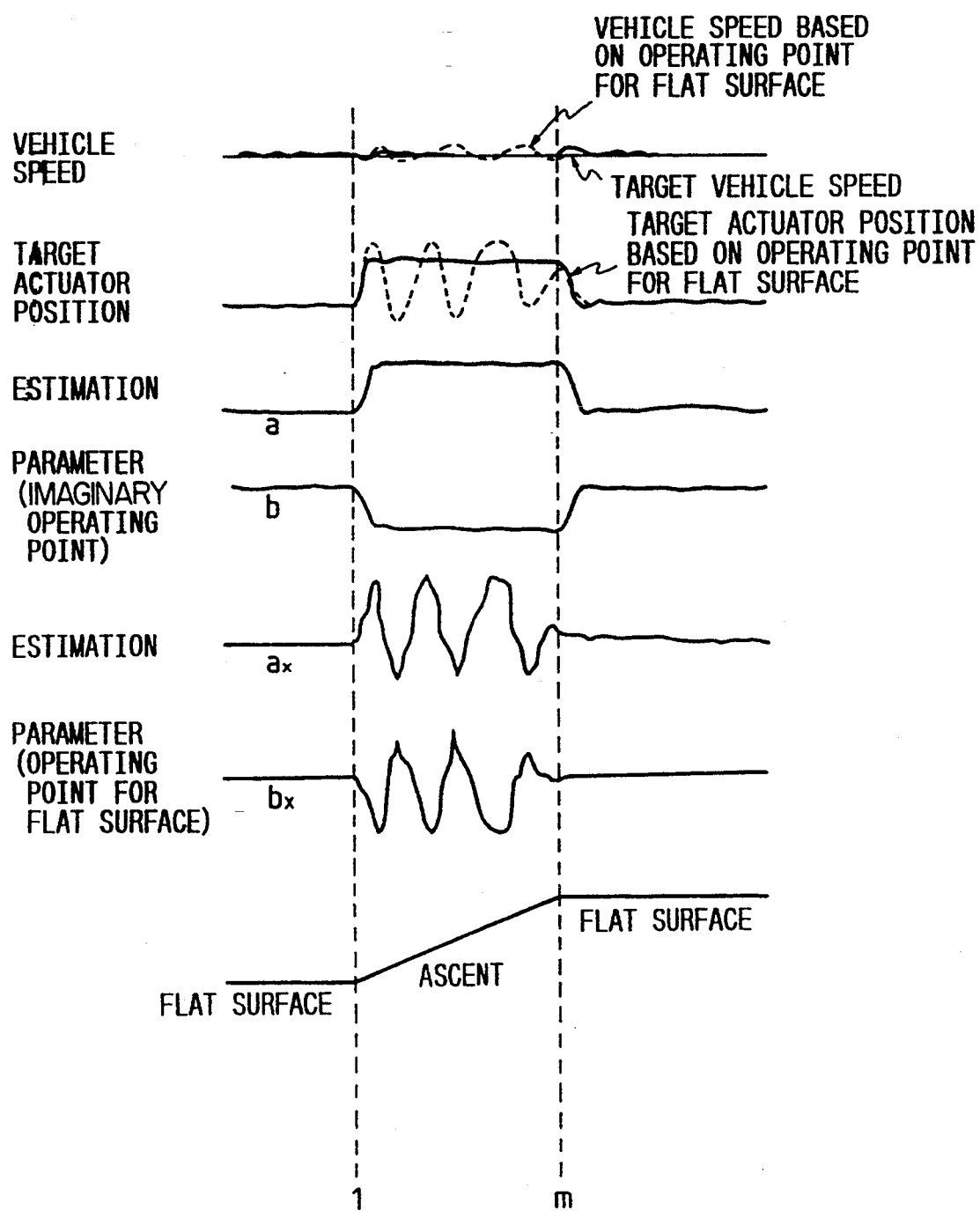
FIG. 22 is a time chart for describing an operation in this embodiment.
Figure 23:
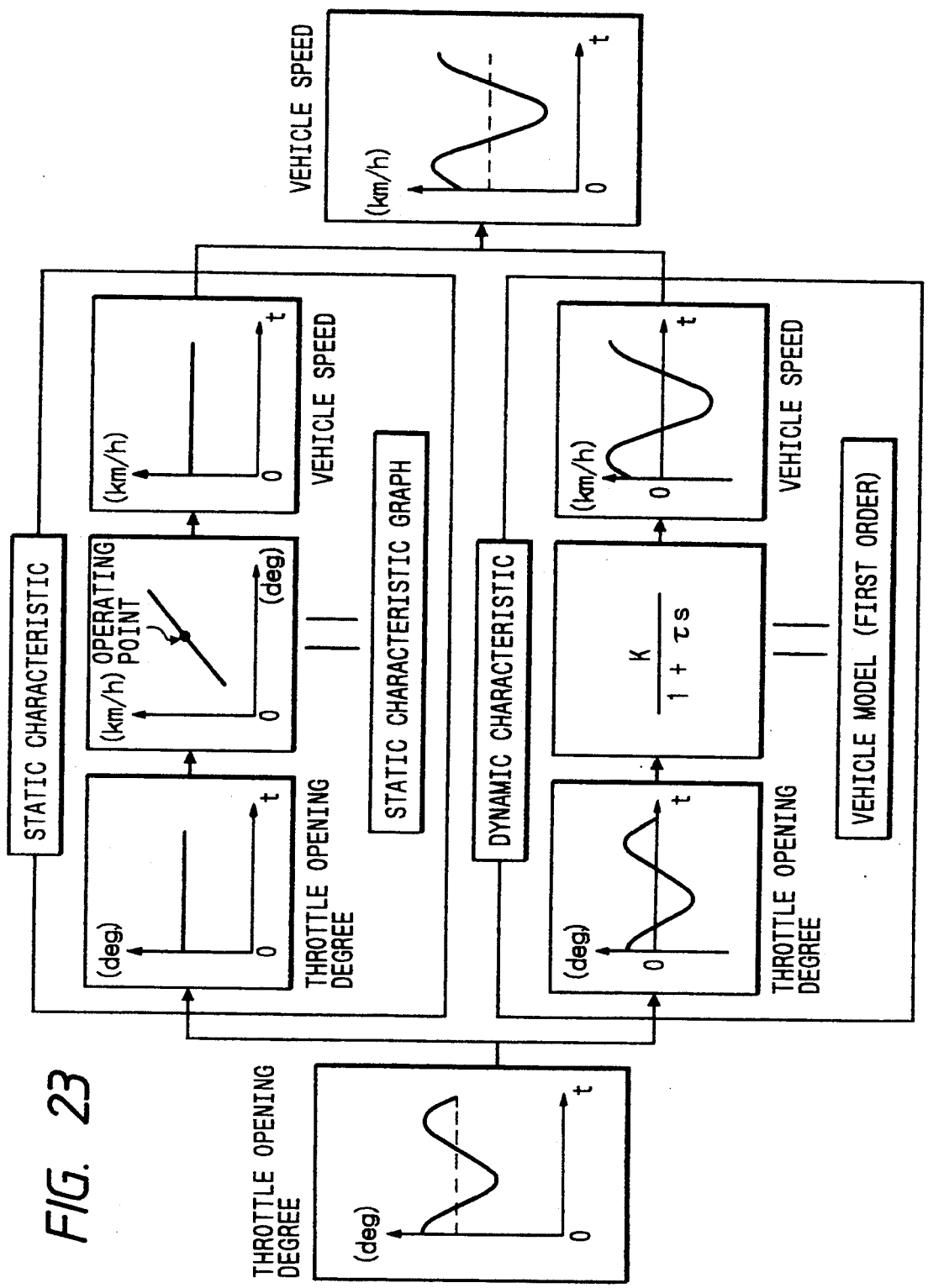
FIG. 23 is an illustration for a static characteristic and a dynamic characteristic of a motor vehicle.

FIG. 22 shows the variations of the respective signals occurring when the road surface slope varies. As obvious from FIG. 22, in the case that the road surface varies from a flat state to an ascent state at the time 1 when the motor vehicle is travelling under the cruising control, the estimation parameters a and b obtained when the vehicle model is estimated on the basis of the imaginary operating point set (so as not to be affected by the road surface slope) follow the actual variation. However, the estimation parameters $a_x$ and $b_x$, taken when the operating point is previously set at the time of a flat surface to estimate the model respectively, oscillate because of the inclusion of data due to the difference between the operating points other than the actual dynamic characteristic. The target actuator position also oscillates in response to the oscillation of the estimation parameters $a_x$ and $b_x$, thereby adversely affecting the vehicle speed control system. Thereafter, when reaching a flat road surface at a time m, in both the model estimation based on the imaginary operating point and the model estimation based on the setting of the operating point, the model parameters a, b, ax and bx can accurately estimated because the operating points match.

As described above, according to this invention, an imaginary operating point which is not affected by the variation of the vehicle static characteristic is used so that the vehicle dynamic characteristic is estimated by using the vehicle speed and the actuator position converted on the basis of the imaginary operating point, and therefore it is possible to accurately estimate the vehicle dynamic characteristic irrespective of variation of the vehicle static characteristic, thus improving the control characteristic in the cruising control.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, it is possible to entirely use the throttle opening degree in place of the actuator position.

What is claimed is:

1. A speed control system for a motor vehicle, comprising:
    means for detecting a travelling speed of said vehicle;
    means for setting a target speed for a constant-speed travelling of said vehicle on a road surface;
    actuator means for adjusting the travelling speed of said vehicle;
    means for controlling said actuator means based on a control characteristic so that the travelling speed of said vehicle follows said target speed;
    means for detecting an operating position of said actuator means;
    means for detecting a gear-shifted state in a transmission of said vehicle;
    means for setting an imaginary operating point for the operating position of said actuator means on the basis of the gear-shifted state in said transmission wherein said imaginary operating point is defined to be a point where a group of straight lines intersect, each straight line being indicative of a static characteristic corresponding to a slope of a road surface on which said vehicle is travelling, said imaginary operating point being indicative of an original operating point of a prestored static characteristic of the travelling speed of said vehicle;
    means for converting data including the detected vehicle travelling speed and the detected actuator means operating position into data defined in terms of the set imaginary operating point;
    means for estimating a dynamic characteristic of said vehicle from a variation of the travelling speed of said vehicle to a variation of the operating position of said actuator means on the basis of the converted travelling speed and actuator means operating position; and
    means for adjusting a control characteristic of said control means in accordance with the estimated vehicle dynamic characteristic.

2. A system as claimed in claim 1, further comprising means for detecting a set state of a lock-up clutch, and wherein said imaginary operating point setting means sets said imaginary operating point on the basis of the gear-shifted state in said transmission and said set state of said lock-up clutch.

3. A system as claimed in claim 1, wherein said data converting means performs the data conversion so that said static characteristic of said vehicle is not affected by the operating position of said actuator means.

4. A system as claimed in claim 1, wherein said static characteristic is approximated to a straight line when said vehicle is under a predetermined condition and a slope of said road surface is constant.

5. A system as claimed in claim 1, wherein said imaginary operating point setting means sets said imaginary operating point so as not to be affected by a slope of said road surface.

6. A speed control system for a motor vehicle, comprising:
    means for detecting a travelling speed of said vehicle;
    means for setting a target speed for a constant-speed travelling of said vehicle on a road surface;
    actuator means for adjusting the travelling speed of said vehicle;
    means for controlling said actuator means based on a control characteristic so that the travelling speed of said vehicle follows said target speed;
    means for detecting an operating position of said actuator means;
    means for detecting a gear-shifted state in a transmission of said vehicle;

means for estimating a model of said vehicle on the basis of the travelling speed of said vehicle and the operating position of said actuator means;

means for setting an imaginary operating point for the operating position of said actuator means on the basis of the gear-shifted state in said transmission wherein said imaginary operating point is defined to be a point where a group of straight lines intersect, each straight line being indicative of a static characteristic corresponding to a slope of a road surface on which said vehicle is travelling, said imaginary operating point being indicative of an original operating point of a prestored static characteristic of the travelling speed of said vehicle;

means for converting data including the detected vehicle travelling speed and the detected actuator means operating position into data defined in terms of the set imaginary operating point;

means for extracting a dynamic characteristic component of said vehicle from the estimated vehicle model on the basis of the converted travelling speed and actuatory means operating position; and means for adjusting a control characteristic of said control means in accordance with the extracted vehicle dynamic characteristic.

7. A system as claimed in claim 6, further comprising means for detecting a set state of a lock-up clutch, and wherein said imaginary operating point setting means sets said imaginary operating point on the basis of the gear-shifted state in said transmission and said set state of said lock-up clutch.

8. A system as claimed in claim 6, wherein said data converting means performs the data conversion so that said static characteristic of said vehicle is not affected by the operating position of said actuator means.

9. A system as claimed in claim 6, wherein said static characteristic is approximated to a straight line when said vehicle is under a predetermined condition and a slope of said road surface is constant.

10. A system as claimed in claim 6, wherein said imaginary operating point setting means sets said imaginary operating point so as not to be affected by a slope of said road surface.

11. A method of controlling the speed of a motor vehicle comprising the steps of:

detecting a travelling speed of said vehicle;

setting a target speed for a constant-speed travelling of said vehicle on a road surface;

detecting an operating position of an actuator which adjusts the travelling speed of said vehicle;

detecting a gear-shifted state in a transmission of said vehicle;

setting an imaginary operating point for the operating position of said actuator on the basis of the gear-shifted state in said transmission wherein said setting step includes defining said imaginary operating point to be a point where a group of straight lines intersect, each straight line being indicative of a static characteristic corresponding to a slope of a road surface on which said vehicle is travelling, said imaginary operating point being indicative of an original operating point of a prestored static characteristic of the travelling speed of said vehicle;

converting data including the detected vehicle travelling speed and the detected actuator operating position into data defined in terms of the set imaginary operating point;

estimating a dynamic characteristic of said vehicle from a variation of the travelling speed of said vehicle to a variation of the operating position of said actuator on the basis of the converted travelling speed and actuator operating position;

adjusting a control characteristic of a control means, which controls the actuator, in accordance with the estimated vehicle dynamic characteristic; and controlling, with said control means, said actuator based on said adjusted control characteristic so that the travelling speed of said vehicle follows said target speed.

12. A method as claimed in claim 11, further comprising the step of detecting a set state of a lock-up clutch, and wherein said setting step includes setting said imaginary operating point on the basis of the gear-shifted state in said transmission and said set state of said lock-up clutch.

13. A method as claimed in claim 11, wherein said data converting step includes performing the data conversion so that said static characteristic of said vehicle is not affected by the operating position of said actuator means.

14. A system as claimed in claim 11, wherein in said setting step said static characteristic is approximated to a straight line when said vehicle is under a predetermined condition and a slope of said road surface is constant.

15. A system as claimed in claim 11, wherein said setting step sets said imaginary operating point so as not to be affected by a slope of said road surface.

16. A method of controlling the speed of a motor vehicle comprising the steps of:

detecting a travelling speed of said vehicle;

setting a target speed for a constant-speed travelling of said vehicle on a road surface;

detecting an operating position of an actuator which adjusts the travelling speed of said vehicle;

detecting a gear-shifted state in a transmission of said vehicle;

estimating a model of said vehicle on the basis of the travelling speed of said vehicle and the operating position of said actuator;

setting an imaginary operating point for the operating position of said actuator on the basis of the gear-shifted state in said transmission wherein said setting step includes defining said imaginary operating point to be a point where a group of straight lines intersect, each straight line being indicative of a static characteristic corresponding to a slope of a road surface on which said vehicle is travelling, said imaginary operating point being indicative of an original operating point of a prestored static characteristic of the travelling speed of said vehicle;

converting data including the detected vehicle travelling speed and the detected actuator operating position into data defined in terms of the set imaginary operating point; extracting a dynamic characteristic component of said vehicle from the estimated vehicle model on the basis of the converted travelling speed and actuator operating position; and adjusting a control characteristic of a control means, which controls said actuator, in accordance with the extracted vehicle dynamic characteristic; and controlling said actuator, with said control means, based on said control characteristic so that the travelling speed of said vehicle follows said target speed.

17. A method as claimed in claim 16, further comprising the step of detecting a set state of a lock-up clutch, and wherein said setting step includes setting said imaginary operating point on the basis of the gear-shifted state in said transmission and said set state of said lock-up clutch.

18. A method as claimed in claim 16, wherein said data converting step includes performing the data conversion so that said static characteristic of said vehicle is not affected by the operating position of said actuator means.

19. A system as claimed in claim 16, wherein in said setting step said static characteristic is approximated to a straight line when said vehicle is under a predetermined condition and a slope of said road surface is constant.

20. A system as claimed in claim 16, wherein said setting step sets said imaginary operating point so as not to be affected by a slope of said road surface.

* * * * *